United States Patent
Weber et al.

(10) Patent No.: US 12,442,413 B2
(45) Date of Patent: Oct. 14, 2025

(54) ZERO ENDPLAY CRANKSHAFT

(71) Applicant: Cummins Inc., Columbus, IN (US)

(72) Inventors: Gregory A. Weber, Greensburg, IN (US); Mark G. Luehrmann, Hope, IN (US); Parker Emory Harwood, Columbus, IN (US)

(73) Assignee: Cummins Inc., Columbus, IN (US)

( * ) Notice: Subject to any disclaimer, the term of this patent is extended or adjusted under 35 U.S.C. 154(b) by 126 days.

(21) Appl. No.: 18/104,415

(22) Filed: Feb. 1, 2023

(65) Prior Publication Data

US 2023/0175548 A1 Jun. 8, 2023

Related U.S. Application Data

(63) Continuation of application No. PCT/US2021/048810, filed on Sep. 2, 2021.

(60) Provisional application No. 63/073,488, filed on Sep. 2, 2020.

(51) Int. Cl.
*F16C 27/02* (2006.01)
*F02B 77/00* (2006.01)

(52) U.S. Cl.
CPC .............. *F16C 27/02* (2013.01); *F02B 77/00* (2013.01); *F16C 2240/14* (2013.01)

(58) Field of Classification Search
CPC ........ F16C 27/02; F16C 2240/14; F16C 9/03; F16C 17/107; F16C 3/06; F16C 9/02; F02B 77/00
See application file for complete search history.

(56) References Cited

U.S. PATENT DOCUMENTS

| | | | |
|---|---|---|---|
| 2,768,033 A | 10/1956 | Morris | |
| 4,053,162 A * | 10/1977 | Bjerk | F16C 9/02 277/431 |
| 4,949,981 A * | 8/1990 | Nagashima | F16J 15/3268 277/573 |
| 5,951,270 A | 9/1999 | DuMoulin et al. | |
| 2002/0002960 A1 * | 1/2002 | Haas | F16F 15/283 123/192.1 |

(Continued)

FOREIGN PATENT DOCUMENTS

TW I541431 B * 7/2016 .............. F16C 27/02

OTHER PUBLICATIONS

Machine Translation of TWI541431B Pdf File Name: "TWI541431B_Machine_Translation.pdf".*

(Continued)

*Primary Examiner* — Lindsay M Low
*Assistant Examiner* — Ruben Picon-Feliciano
(74) *Attorney, Agent, or Firm* — Taft Stettinius & Hollister LLP

(57) ABSTRACT

A biasing member assembled with a bearing and a crankshaft wherein the bearing is configured to receive the crankshaft. The crankshaft is assembled with an internal combustion engine. The biasing member biases the bearing in an axial direction relative to the crankshaft to reduce an endplay of the crankshaft while the engine is operable in a normal operating condition. The biasing member provides a resilient biasing force for biasing the bearing into engagement with a cylinder block when the crankshaft is operational to thereby eliminate or reduce the crankshaft endplay and improve the sealing performance of a crankshaft axial seal.

20 Claims, 3 Drawing Sheets

(56) References Cited

U.S. PATENT DOCUMENTS

| | | | |
|---|---|---|---|
| 2002/0012485 A1* | 1/2002 | Zauner | F16C 9/02 |
| | | | 384/484 |
| 2007/0127859 A1 | 6/2007 | Smook | |
| 2018/0031035 A1 | 2/2018 | Li | |
| 2020/0232384 A1* | 7/2020 | Chottiner | F02B 75/048 |

OTHER PUBLICATIONS

International Preliminary Report on Patentability; the International Bureau of WIPO; International Patent Application No. PCT/US2021/048810; Mar. 16, 2023; 6 pages.

International Search Report; International Searching Authority; International Patent Application No. PCT/US2021/048810; Dec. 16, 2021; 2 pages.

Written Opinion of the International Searching Authority; International Searching Authority; International Patent Application No. PCT/US2021/048810; Dec. 16, 2021; 5 pages.

* cited by examiner

ZERO ENDPLAY CRANKSHAFT

CROSS-REFERENCE TO RELATED APPLICATIONS

The present application is a continuation of International PCT Application No. PCT/US2021/048810 filed on Sep. 2, 2021, which claims the benefit of the filing date of U.S. Provisional Application No. 63/073,488 filed on Sep. 2, 2020, the contents of each application is incorporated herein by reference in their entirety.

TECHNICAL FIELD

The present application relates generally to a biasing mechanism assembled with a bearing for a crankshaft to reduce crankshaft endplay during normal operating conditions.

BACKGROUND

A crankshaft is supported by an engine block, with the engine's main bearings allowing the crankshaft to rotate within the engine block. Thrust and/or journal bearings can be assembled with the main bearings in a floating arrangement. Thrust bearings locate and help restrain the crankshaft from moving forward and backward in the engine block and thereby also provide for a specified amount of crankshaft endplay. Thrust clearance or crankshaft endplay is the amount of clearance between the crankshaft's thrust plate and the vertical surface of the thrust bearing. Thrust bearing clearance or crankshaft endplay is important because there are transmission loads that tend to force the crankshaft forward. The transmission loads increase the axial displacement and axial load of the crankshaft. Thrust bearing failures can happen due to overloading of the thrust bearing by the crankshaft due to excessive axial loads.

Crankshaft endplay can vary depending on the amount of the fore and aft movement or axial displacement of the crankshaft in the engine block. If the crankshaft is assembled with too much crankshaft endplay or axial displacement, the forward movement of the crankshaft in the engine block can damage the main bearing caps and block. Limiting the amount of crankshaft endplay is beneficial to maximize the crankshaft's ability to deliver a long service life.

A crankshaft axial seal is the primary barrier that keeps oil from leaking around the end of the crankshaft and out of the crankcase. The crankshaft axial seal will axially float to accommodate for the endplay of the crankshaft. The seal performance of a crankshaft axial seal ability is limited by the sliding axial movement or endplay of the crankshaft. As the crankshaft moves axially, in some situations, the axial seal will be loaded more than in a nominal or ideal installed state, which results in decreased seal performance of the axial seal and in particular will result in poor seal lip contact. For example, in a maximum crankshaft endplay condition, the endplay causes the axial seal lip to change in its loading profile from lightly loaded to heavily loaded and the seal performance will be overloaded which results in poor seal lip contact. In other situations, the axial seal can be unloaded more than in a nominal or ideal installed state, which results in decreased seal performance of the axial seal. In a minimum crankshaft endplay condition, the endplay causes the axial seal lip to change in its loading profile from heavily loaded to lightly loaded and the seal performance is now under-loaded which results in a poor seal lip contact. Both overloaded and under-loaded conditions result in non-optimal seal lip loading which can result in reduced performance and eventually in premature oil leaks.

Therefore, further contributions in this area of technology are needed to improve the sealing performance of an axial seal of a crankshaft by eliminating or reducing the crankshaft endplay. Therefore, there remains a significant need for the apparatuses, methods and systems disclosed herein.

SUMMARY

The present disclosure describes systems, methods, and apparatuses that include a biasing member assembled with a bearing for a crankshaft of an internal combustion engine, wherein the bearing is configured to receive the crankshaft. The biasing member biases the bearing and the crankshaft in an axial direction relative to the crankshaft to reduce an endplay of the crankshaft while the engine is operable in a normal operating condition. The biasing member is positioned between the crankshaft and the bearing.

As the crankshaft floats on its endplay clearance, this clearance increases and decreases the "contacting" sealing lip loading which is usually not optimal for seal wear or seal life. Over time and usage of the crankshaft and bearing, the crankshaft endplay increases due to the bearing being worn and thus the minimum seal loading is typically at risk of also being compromised. The biasing member of the present disclosure is assembled with the bearing and the crankshaft to reduce the crankshaft endplay therefore making the axial seal more robust against crankshaft endplay.

Axial crankshaft seals allow the seal lip to float on the sealing surface in compensation for crankshaft endplay. Most axial crankshaft seals have an axial float limitation due to the maximum crankshaft endplay however often the axial float limitation is exceeded. The biasing member of the present disclosure decreases axial float by controlling the crankshaft axial position. When the axial load on the crankshaft exceeds the axial spring stiffness of the biasing member then the axial float may only be partially controlled however this operating condition does not occur frequently. Therefore, the biasing member increases the robustness of crankshaft axial seal and improves the seal performance of the crankshaft axial seal.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION OF ILLUSTRATIVE EMBODIMENTS

Figure 2:
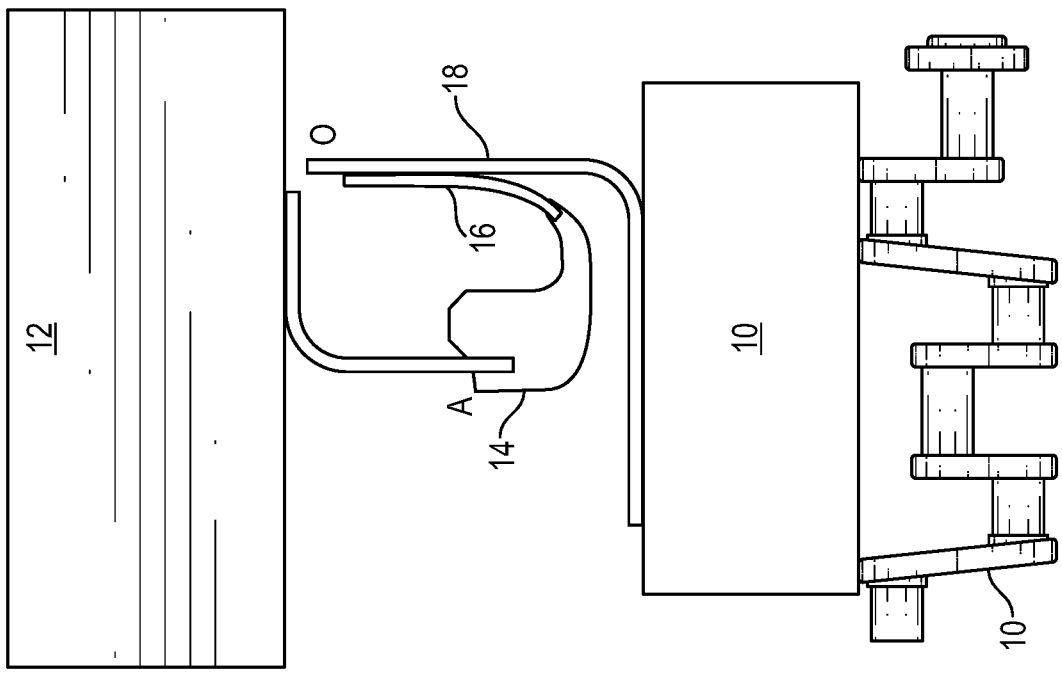
FIG. 2 is the schematic view of the FIG. 1 embodiment in a nominal condition.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Turning now to FIGS. 1-4, is illustrated a crankshaft 10 assembled with a crankshaft housing or cylinder block 12 and an axial crankshaft seal 14. The axial crankshaft seal 14 includes a seal lip 16 that is configured to engage a wear sleeve 18. The function of the axial crankshaft seal 14 and in particular the seal lip 16 is to prevent leakage of oil along the wear sleeve 18 where it emerges from the crankshaft housing or cylinder block 12 in which the crankshaft 10 rotates. In FIGS. 1-4, the "oil side" of the axial crankshaft seal 14 is indicated by the reference "O" and the "air side" is indicated by the reference "A".

Figure 1:
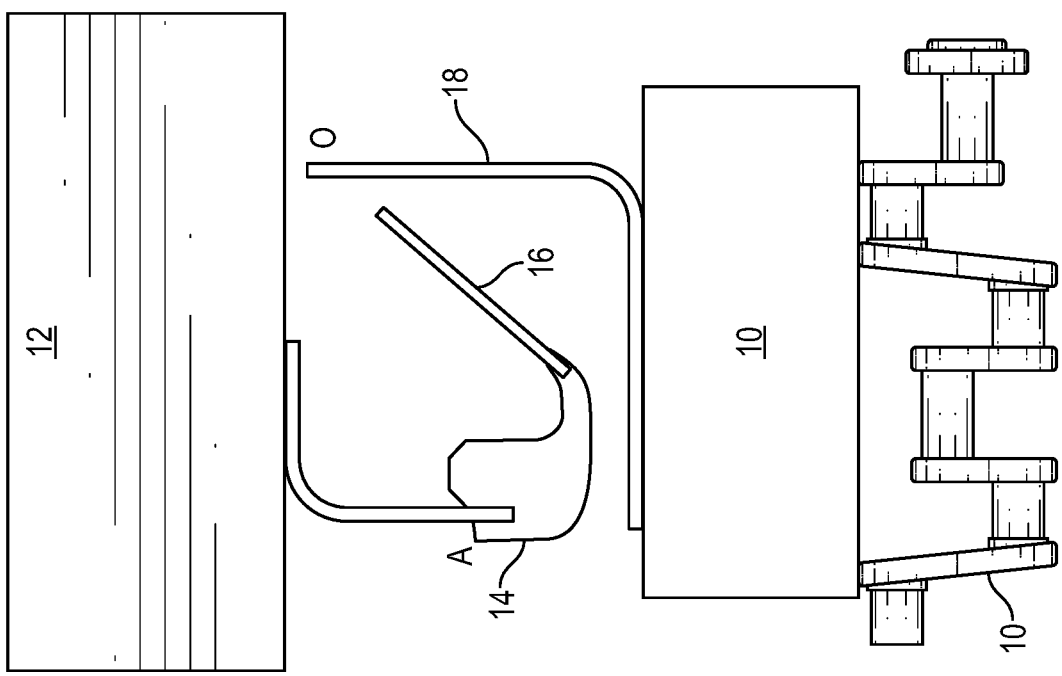
FIG. 1 is a schematic view of a shaft seal for an engine assembly.

FIG. 1 illustrates a free state in which the axial crankshaft seal 14 is not fully assembled with the wear sleeve 18. FIG. 2 illustrates the axial crankshaft seal 14 fully assembled with the wear sleeve 18 wherein the seal lip 16 is in a nominal or centered installed state in which the seal lip 16 shows ideal or adequate seal lip contact with the wear sleeve 18. In FIG. 2, the crankshaft 10 is not operational so there is no additional loading of the axial crankshaft seal 14.

Figure 4:
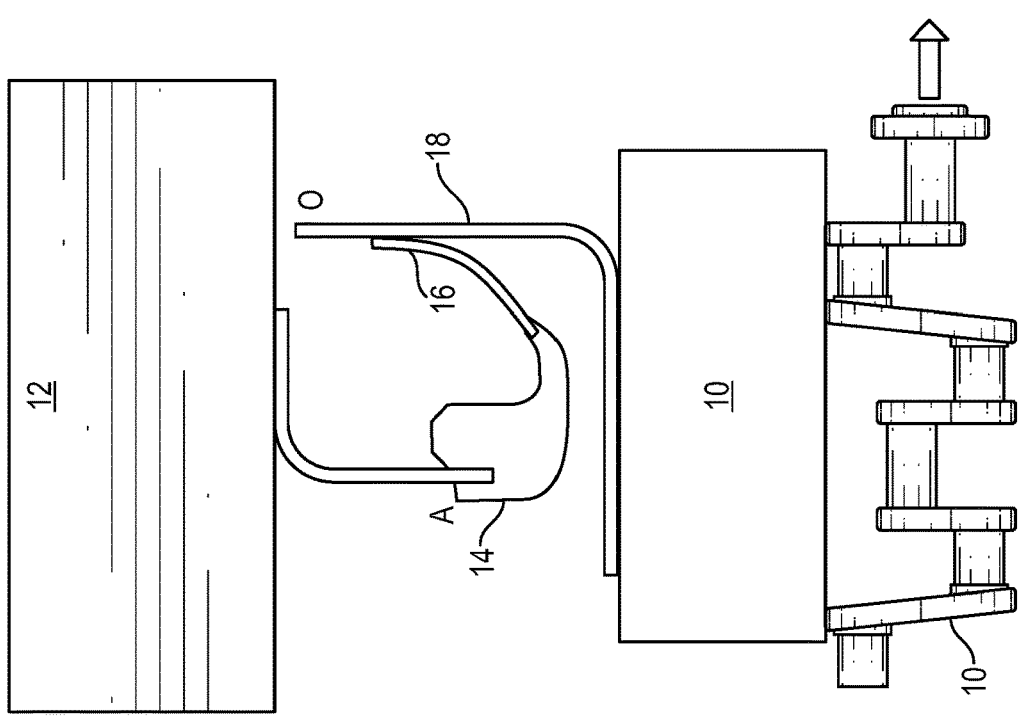
FIG. 4 is the schematic view of the FIG. 1 embodiment in an underloaded condition.
Figure 3:
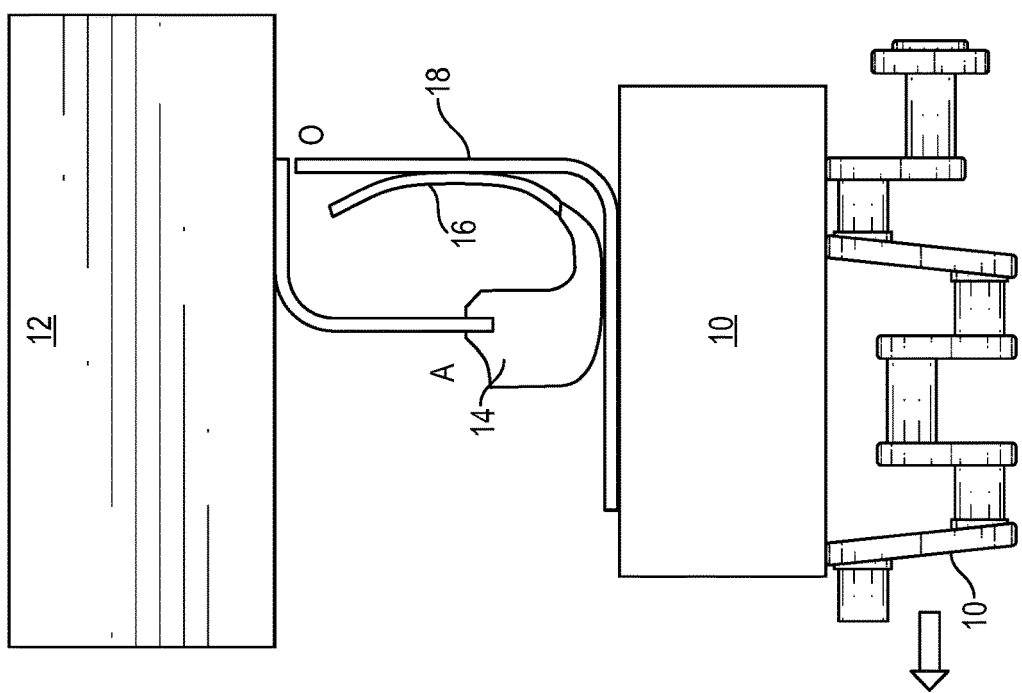
FIG. 3 is the schematic view of the FIG. 1 embodiment in an overloaded condition.

During operation of the crankshaft 10, as the crankshaft 10 is loaded from one side or the other, the crankshaft endplay increases or decreases. A maximum amount of crankshaft endplay is illustrated in FIG. 3 which results in a loading profile of the axial crankshaft seal 14 that is a heavily loaded profile such that the seal lip 16 forms a curled lip which results in a poor seal lip contact between the seal lip 16 and the wear sleeve 18. A minimum amount of crankshaft endplay is illustrated in FIG. 4 which results in a loading profile of the axial crankshaft seal 14 that is a lightly loaded profile such that the seal lip 16 forms a point contact between the seal lip 16 and the wear sleeve 18. In FIGS. 3 and 4, respectively, the maximum and minimum crankshaft endplay causes non-optimal seal lip loading which results in reduced seal performance of the seal lip 16 and eventually oil leaks.

Figure 5:
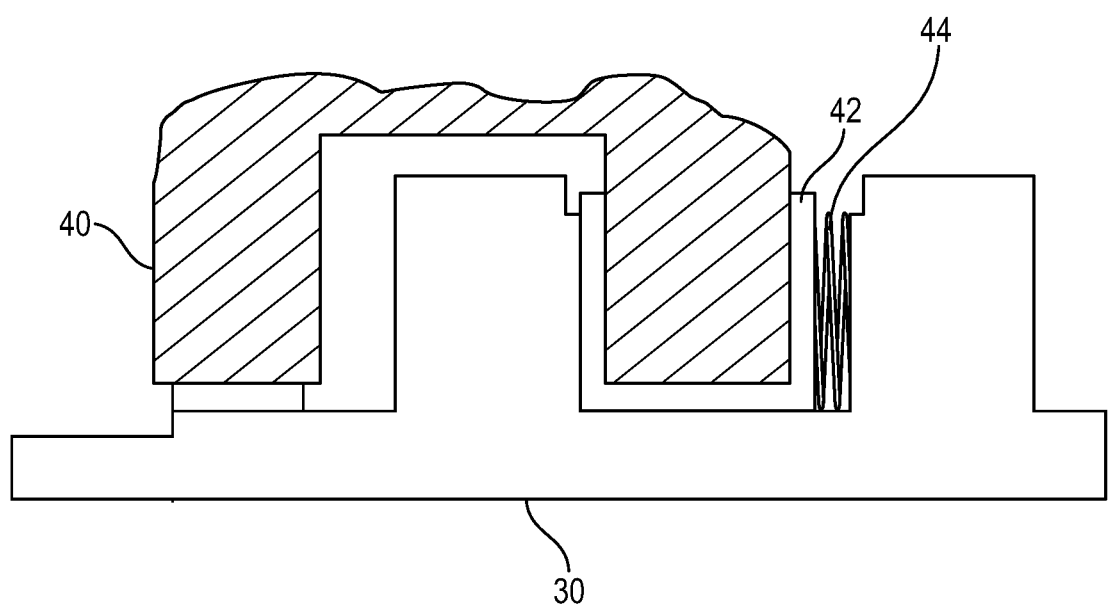
FIG. 5 is a partial side view of a biasing mechanism of the present disclosure.

Turning now to the present application with reference to FIG. 5, is a partial view of a crankshaft 30 of an internal combustion engine (not illustrated). The internal combustion engine can be of any type, and can include a stoichiometric engine, a diesel engine, a gasoline engine, an ethanol engine, and/or a natural gas engine. The typical engine operates on a four-stroke cycle that sequentially includes an air intake stroke, a compression stroke, a power stroke, and an exhaust stroke. The engine includes a number of cylinders and may be any number suitable for the engine. A typical multi-cylinder engine has an engine block with multiple cylinders and a piston in each cylinder that is operably attached to the crankshaft 30. A combustion chamber is formed inside each cylinder. The cylinders may be operated under normal operating conditions of the engine or cranking conditions of the engine.

A transmission may be connected to the engine for adapting the output torque of the engine and transmitting the output torque to a drive shaft. In certain embodiments, the transmission may be connected to the crankshaft 30 via a torque converter, a flywheel, a gearbox, and/or a clutch, which are not shown to preserve clarity. A clutch can be mechanically connected to the crankshaft 30 to facilitate gear changes.

For an automated manual transmission (AMT), the driver can shift gears without depressing a clutch wherein an electronically controlled clutch and gear actuators are used with the transmission. If a gear change is desired then the transmission automatically disengages before the driver selects the new gear. The AMT is automated to help drivers make a gear shift decision. The AMT includes optimized shifting based on grade, vehicle weight, engine torque and throttle position.

In FIG. 5, the crankshaft 30 is assembled with a cylinder block 40 and a bearing 42. The crankshaft 30 can be coupled to a clutch (not illustrated) or an AMT. The bearing 42 is configured to rotatably receive the crankshaft 30 therein and to carry the loads created by movement or rotation of the crankshaft 30. The bearing 42 can include a split insert bearing, a journal bearing, a thrust bearing, or another type of bearing. In the illustrated embodiment, the bearing 42 has a U-shape but alternatively could have two vertical pieces assembled with a horizontal piece. The bearing 42 is used to help control horizontal movement or endplay of the crankshaft 30 however the bearing 42 does not control all of the crankshaft endplay. The bearing 42 is typically used in the thrust position of the cylinder block 40 but can be positioned elsewhere.

The crankshaft 30 and bearing 42 are assembled with a biasing member 44 positioned between the bearing 42 and the crankshaft 30. The biasing member 44 provides a resilient biasing force for biasing the bearing 42 into engagement with the cylinder block 40 when the crankshaft 30 is operational to thereby eliminate or reduce the crankshaft endplay. The biasing member 44 biases against the axial load on the crankshaft 30 thus eliminating and/or reducing the crankshaft endplay under normal operating conditions. The biasing member 44 can be a spring or other similar mechanism. Normal operating conditions of the internal combustion engine do not include clutch actuation time period. Normal operating conditions of the internal combustion engine exclude shift events. The biasing member 44 can assist with AMT applications by reducing the total crankshaft movement during engagement and disengagement of the transmission. The biasing member 44 biases the bearing 42 in an axial direction relative to the crankshaft 30 to reduce endplay of the crankshaft 30 while the engine is operable in a normal operating condition.

Beneficially, when the crankshaft endplay is reduced or eliminated by the assembly of the biasing member 44 with the bearing 42, an axial crankshaft seal (not illustrated in FIG. 5) operates effectively with consistent seal lip loading. The biasing member 44 can be assembled with the crankshaft 10 illustrated in FIGS. 1-4.

The sealing ability of the axial crankshaft seal is sensitive to the following conditions of the crankshaft: crankshaft dynamic runout (DRO) which is the inaccuracy of rotation of the crankshaft wherein the crankshaft does not rotate exactly in line with the main axis of the crankshaft, crankshaft to seal housing bore misalignment (STBM), and to crankshaft endplay. By eliminating the crankshaft endplay with the assembly of the biasing member 44 to the bearing 42 and the crankshaft 30, the axial crankshaft seal (not illustrated) is more tolerant to DRO and STBM.

The biasing member 44 can be assembled with an existing axial crankshaft seal that allows the seal lip to float on the sealing surface in compensation for the crankshaft's endplay.

As is evident from the figures and text presented above, a variety of aspects of the present disclosure are contemplated.

Various aspects of the present application are contemplated. According to one aspect, an apparatus for a crankshaft of an internal combustion engine, the apparatus comprising: a bearing configured to receive the crankshaft; a biasing member assembled with the bearing, the biasing member biases the bearing in an axial direction relative to the crankshaft to reduce an endplay of the crankshaft while the crankshaft is operational.

In any one of the embodiments, wherein the internal combustion engine is operable in a normal operating condition.

In any one of the embodiments, wherein the normal operating condition does not include one of a clutch actuation time period or a shift event.

In any one of the embodiments, wherein the biasing member is a spring.

In any one of the embodiments, wherein the bearing includes a thrust bearing.

In any one of the embodiments, wherein the bearing includes a journal bearing.

In any one of the embodiments, wherein the bearing has a U-shape.

According to another aspect, an apparatus for a bearing assembled with a crankshaft of an internal combustion engine, the apparatus comprising: a biasing member configured to bias at least one of the bearing and the crankshaft in an axial direction relative to the crankshaft to reduce an endplay of the crankshaft while the crankshaft is operational.

In any one of the embodiments, wherein the internal combustion engine is operable in a normal operating condition.

In any one of the embodiments, wherein the normal operating condition does not include one of a clutch actuation time period or a shift event.

In any one of the embodiments, wherein the biasing member is a spring.

In any one of the embodiments, wherein the bearing includes a thrust bearing.

In any one of the embodiments, wherein the bearing includes a journal bearing.

In any one of the embodiments, wherein the bearing has a U-shape.

According to yet another aspect, an apparatus for a bearing assembled with a crankshaft and a cylinder block of an internal combustion engine, the apparatus comprising: a biasing member configured to bias the bearing into engagement with the cylinder block while the crankshaft is operational.

In any one of the embodiments, wherein the internal combustion engine is operable in a normal operating condition.

In any one of the embodiments, wherein the normal operating condition does not include one of a clutch actuation time period or a shift event.

In any one of the embodiments, wherein the biasing member is a spring.

In any one of the embodiments, wherein the bearing includes a thrust bearing.

In any one of the embodiments, wherein the bearing includes a journal bearing.

In any one of the embodiments, wherein the bearing has a U-shape.

In the above description, certain relative terms may be used such as "up," "down," "upper," "lower," "horizontal," "vertical," "left," "right," "proximal," "distal," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In some instances, the benefit of simplicity may provide operational and economic benefits and exclusion of certain elements described herein is contemplated as within the scope of the invention herein by the inventors to achieve such benefits. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for a crankshaft of an internal combustion engine, the apparatus comprising:
a bearing configured to receive the crankshaft;
a biasing member positioned between the crankshaft and the bearing, wherein an axis of the biasing member is aligned with an axis of the bearing, the biasing member biases the bearing towards a cylinder block in an axial direction relative to the crankshaft to reduce an endplay of the crankshaft while the crankshaft is operational.

2. The apparatus of claim 1, wherein the internal combustion engine is operable in a normal operating condition.

3. The apparatus of claim 2, wherein the normal operating condition does not include one of a clutch actuation time period or a shift event.

4. The apparatus of claim 1, wherein the biasing member is a spring.

5. The apparatus of claim 1, wherein the bearing includes a thrust bearing.

6. The apparatus of claim 1, wherein the bearing includes a journal bearing.

7. The apparatus of claim 1, wherein the bearing has a U-shape.

8. An apparatus for a bearing assembled with a crankshaft of an internal combustion engine, the apparatus comprising:
a biasing member positioned between the crankshaft and the bearing, wherein an axis of the biasing member is aligned with an axis of the bearing, the biasing member configured to bias the bearing towards a cylinder block in an axial direction relative to the crankshaft to reduce an endplay of the crankshaft while the crankshaft is operational.

9. The apparatus of claim 8, wherein the internal combustion engine is operable in a normal operating condition.

10. The apparatus of claim 9, wherein the normal operating condition does not include one of a clutch actuation time period or a shift event.

11. The apparatus of claim 8, wherein the biasing member is a spring.

12. The apparatus of claim 8, wherein the bearing includes a thrust bearing.

13. The apparatus of claim 8, wherein the bearing includes a journal bearing.

14. The apparatus of claim 8, wherein the bearing has a U-shape.

15. An apparatus for a bearing assembled with a crankshaft and a cylinder block of an internal combustion engine, the apparatus comprising:
a biasing member positioned between the crankshaft and the bearing, wherein an axis of the biasing member is aligned with an axis of the bearing, the biasing member configured to bias the bearing into engagement with the cylinder block while the crankshaft is operational.

16. The apparatus of claim 15, wherein the internal combustion engine is operable in a normal operating condition.

17. The apparatus of claim 16, wherein the normal operating condition does not include one of a clutch actuation time period or a shift event.

18. The apparatus of claim 15, wherein the biasing member is a spring.

19. The apparatus of claim 15, wherein the bearing includes a thrust bearing or a journal bearing.

20. The apparatus of claim 15, wherein the bearing has a U-shape.

* * * * *